(12) United States Patent
Wilson et al.

(10) Patent No.: US 8,929,012 B1
(45) Date of Patent: Jan. 6, 2015

(54) OFFSET-TOLERANT LOW NOISE AMPLIFIER

(71) Applicant: LSI Corporation, San Jose, CA (US)

(72) Inventors: Ross S. Wilson, Menlo Park, CA (US); Edwin X. Li, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/052,820

(22) Filed: Oct. 14, 2013

Related U.S. Application Data (60) Provisional application No. 61/875,936, filed on Sep. 10, 2013.

(51) Int. Cl.
*G11B 5/09* (2006.01)

(52) U.S. Cl.
CPC ........................................ *G11B 5/09* (2013.01)
USPC .......................................................... 360/46

(58) Field of Classification Search
None
See application file for complete search history.

(56) References Cited

U.S. PATENT DOCUMENTS

| | | | | |
|---|---|---|---|---|
| 4,755,980 | A * | 7/1988 | Yoshimaru et al. | 369/47.52 |
| 5,249,169 | A * | 9/1993 | Ogawa | 369/44.34 |
| 5,635,934 | A * | 6/1997 | Brown | 341/118 |
| 5,731,740 | A | 3/1998 | van de Westerlo | |
| 6,111,711 | A * | 8/2000 | Barber et al. | 360/46 |
| 6,114,905 | A * | 9/2000 | Hashimoto et al. | 330/252 |
| 6,667,614 | B1 * | 12/2003 | McMahon et al. | 324/212 |
| 7,839,593 | B1 * | 11/2010 | Li | 360/66 |
| 2002/0063987 | A1 * | 5/2002 | Briskin | 360/66 |
| 2005/0174669 | A1 * | 8/2005 | Contreras et al. | 360/46 |
| 2006/0268445 | A1 * | 11/2006 | Brannon et al. | 360/75 |
| 2007/0129038 | A1 | 6/2007 | Ragan et al. | |
| 2007/0242384 | A1 * | 10/2007 | Contreras et al. | 360/66 |

* cited by examiner

*Primary Examiner* — Peter Vincent Agustin
(74) *Attorney, Agent, or Firm* — Suiter Swantz pc llo (57) ABSTRACT

The disclosure is directed to a low noise amplifier (LNA) configuration that compensates for DC offsets of incoming signals from a magnetoresistive head. According to various embodiments, the LNA includes a shunt-feedback differential pair of amplifiers adaptively biased according to a detected input DC voltage offset of the incoming signals from the magnetoresistive head. The LNA is thus enabled to amplify the AC signal component substantially unaffected by the DC offset. The DC component in the LNA output signal is then removable via offset compensating circuitry located between the LNA and subsequent stages without significant signal-to-noise ratio (SNR) penalty.

17 Claims, 10 Drawing Sheets

OFFSET-TOLERANT LOW NOISE AMPLIFIER

PRIORITY

The present application claims priority under 35 U.S.C. §119(e) to U.S. Provisional Application Ser. No. 61/875,936, entitled OFFSET-TOLERANT LOW NOISE AMPLIFIER, By Ross S. Wilson et al., filed Sep. 10, 2013, which is currently co-pending, or is an application of which currently co-pending application(s) are entitled to the benefit of the filing date. The above-referenced provisional application is hereby incorporated by reference in its entirety.

FIELD OF INVENTION

The disclosure relates to the field of signal processing and amplification in the presence of DC offsets.

BACKGROUND

Within the read path of a magnetic recording system, bias current flow through a magnetoresistive (MR) head gives rise to direct current (DC) offsets of several hundred millivolts across the low noise amplifier (LNA) input. If this offset is not blocked, it will saturate the LNA and subsequent amplifying stages. Existing methods eliminate the offset by utilizing DC blocking capacitors located ahead of the LNA, often resulting in undesirable parasitic capacitance to ground and large capacitance values which are not amenable to integration. Alternatively, the offset may be compensated with common-gate or common-base input stages, wherein the effect of input offset is canceled with DC shifts in gate or base potential. Common control-electrode topologies, however, tend to produce higher noise figures than common-emitter configurations. In light of the foregoing deficiencies, there exists a need in the art for innovative LNA architectures.

SUMMARY

Various embodiments of the disclosure are directed to a shunt-feedback differential LNA operable in the presence of DC offsets. The LNA includes a first amplifier and a second amplifier configured to receive input signals, respectively, from a first terminal and a second terminal of a magnetoresistive head. The LNA further includes biasing circuitry configured to bias the first amplifier and the second amplifier according to a detected input DC voltage offset of the incoming signals from the magnetoresistive head. Because each amplifier of the differential pair is separately biased, the LNA is enabled to amplify the AC signal component substantially unaffected by the DC offset. The DC component in the LNA output signal is then removable via offset compensating circuitry located between the LNA and subsequent stages without significant signal-to-noise ratio (SNR) penalty.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which:

FIG. 2C1 illustrates circuitry of a signal path of a magnetic recording system including a shunt-feedback differential low noise amplifier, in accordance with an embodiment of the disclosure;

FIG. 2C2 illustrates circuitry of a signal path of a magnetic recording system including a shunt-feedback differential low noise amplifier, in accordance with an embodiment of the disclosure;

FIG. 4C illustrates circuitry of a signal path of a magnetic recording system including a shunt-feedback differential low noise amplifier, in accordance with an embodiment of the disclosure;

FIG. 4C1 illustrates circuitry of a signal path of a magnetic recording system including a shunt-feedback differential low noise amplifier, in accordance with an embodiment of the disclosure;

FIG. 4C2 illustrates circuitry of a signal path of a magnetic recording system including a shunt-feedback differential low noise amplifier, in accordance with an embodiment of the disclosure;

DETAILED DESCRIPTION

Figure 1:
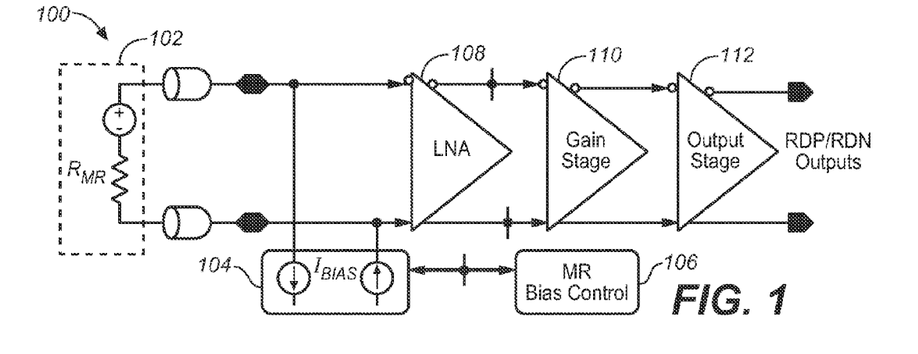
FIG. 1 is a block diagram illustrating a read path of a magnetic recording system, in accordance with an embodiment of the disclosure.

Reference will now be made in detail to the embodiments disclosed, which are illustrated in the accompanying drawings. An embodiment of a read path 100 of a magnetic recording system is illustrated in FIG. 1. The read path 100 forms an environment supporting various embodiments of a low noise amplifier (LNA) 108 and associated circuitry which are illustrated in FIGS. 2A through 7 and further described below.

Looking now to FIG. 1, the read path 100 includes a magnetoresistive (MR) head 102 configured to transduce signals from a magnetic storage medium, such as a hard disk drive (HDD) platter. A series voltage-source models the signal induced in the head by flux changes in the medium. The incoming data signals are transferred by a transmission line to the LNA 108 and then to subsequent gain and output stages 110 and 112. The read path 100 further includes one or more current sources 104 driven by MR bias control circuitry 106. The current sources 104 are configured to generate a DC current $I_{BIAS}$ to bias a MR read transducer of the MR head 102. As a result of being biased by the DC current $I_{BIAS}$, the playback signal from the MR head 102 is superimposed on a DC voltage (i.e. DC offset=$I_{BIAS}*R_{MR}$, where $R_{MR}$ is an impedance of the MR head 102). In some embodiments, the biasing current sources 104 may be replaced by at least one voltage source exhibiting high impedance at signal frequencies of interest.

Unlike counterparts in the radio frequency signal processing and other communication fields, the LNA 108 being fed by signals from the MR head 102 must contend with the DC voltage across the MR head 102 and a requirement for a low LF corner frequency (e.g. in the order of 100 KHz). This DC component is typically eliminated ahead of the LNA 108, before the amplified playback signal is forwarded to the additional gain and output-driving stages 110 and 112, and thence over the RDP/RDN terminals to the Recording Channel. Several LNA circuits are described by the following: W. Zhou et al., "A capacitor cross-coupled common-gate low-noise amplifier," *IEEE Trans. Circuits Systems*, Vol. 52, No. 12, December 2005; Z. Zheng, S. Lam, and S. Sutardja, "A 0.55 nV/√Hz gigabit fully-differential CMOS preamplifier for MR/GMR read application,"*ISSCC Digest Technical Papers*, February 2002; and H. Veenstra, J. Mulder, L. Le, and G. Grillo, "A 1 Gb/s read/write preamplifier for hard-disc-drive applications,"*ISSCC Digest Technical Papers*, February 2001. Various portions of the circuits noted below are discussed by these references, which are hereby incorporated in their entirety.

Several LNA circuits operable in the presence of DC input voltage offsets are known in the art; however, various deficiencies are yet to be cured. Embodiments of an LNA circuit include a common gate/base stage having gates bypassed to AC ground. In accordance with said embodiments, a current-output feedback nulling loop injects current into gate bypass capacitors to establish a potential difference ($V_{MR}=I_{BIAS}*R_{MR}$) across the gates, thereby eliminating the effect of the DC offset on drain current unbalance. Similar embodiments further include noise-cancelling cross-coupling capacitors as described by Zhou et al., which double as compensating capacitors in the nulling loop. The foregoing approaches, although effective, do not provide high current gain and require separate tail current sources which introduce additional noise.

Some other embodiments of an LNA circuit include a differential shunt-feedback arrangement employing DC blocking capacitors at the LNA input. As the desired playback signal contains energy below ~1 MHz, and assuming that the shunt-feedback stages are configured to yield ~50Ω differential input impedance, there should be DC blocking capacitance of approximately $C=1/(2\pi*10^6*(50/2))\approx 6$ nF. To accommodate practical constraints, the value of C can be reduced by AC coupling the input to the differential pair, where the input impedance is high. However, the foregoing approach is burdened by DC current flow through a feedback resistor of the differential pair which has a disturbing effect on MR Head bias current.

Figure 2A:
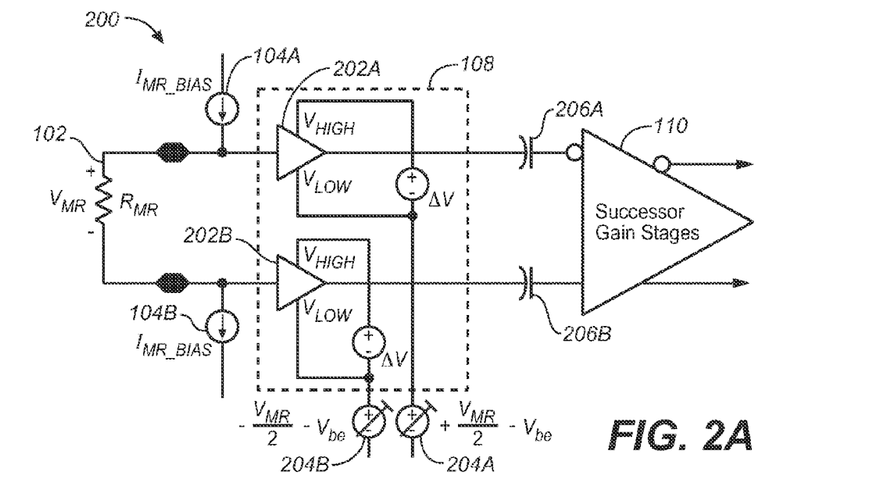
FIG. 2A is a block diagram illustrating a signal path of a magnetic recording system including a shunt-feedback differential low noise amplifier, in accordance with an embodiment of the disclosure.

LNA architectures having several advantages, such as improved SNR or simpler circuit design, are described below in accordance with embodiments of the disclosure. FIG. 2A shows an embodiment of a signal path 200 including at least a portion of a read path with an LNA 108 operable in the presence of DC voltage offsets. The underlying principle of the LNA design illustrated in FIG. 2A is the use of a pair of elementary shunt-feedback amplifiers 202 requiring a relatively small amount of supporting biasing circuitry 204. In some embodiments, the LNA 108 includes a first amplifier 202A and a second amplifier 202B biased according to respective biasing circuitry 204A and 204B. The biasing circuitry 204 is configured to reference the $V_{LOW}$ terminal of each amplifier 202A and 202B to $\pm V_{MR}/2-V_{BE}$, respectively, where $V_{BE}$ is the base-emitter voltage and $V_{MR}$ is the detected input DC voltage offset of the MR head 102 resulting from the bias current $I_{MR\_BIAS}$ applied by the biasing current sources 104.

The incoming playback signal from the MR head 102 is thus amplified by the shunt-feedback differential pairs 202 as if the signal included no DC offset because the input of each amplifier 202A and 202B is defined relative to $V_{LOW}$. In other words, incoming signals from the first (+) terminal and the second (−) terminal of the MR head 102 appear to possess no DC offset from the perspective of the corresponding amplifier inputs to the first amplifier 202A and the second amplifier 202B of the differential pair 202 making up the LNA 108.

The amplifiers 202A and 202B jointly realize a differential-in-differential-out LNA 108 having a low noise figure because each amplifier is capable of being reduced to its bare essentials. Furthermore, the differential pair 202 does not require DC blocking capacitors located ahead of the LNA 108 which can result in signal distortion from parasitic capacitance or degraded SNR from high-value attenuation. However, because the two shunt-feedback amplifiers 202A and 202B are referenced to voltages differing by $V_{MR}$, this DC offset is preserved at the amplifiers' outputs and must be removed to prevent overload of the following stages (e.g. gain stage 110 and so on). To substantially eliminate the DC component from the output signals of the LNA 108, offset-compensating circuitry 206 is included between the LNA 108 and subsequent stages.

The input impedance at subsequent stages can be raised without significant SNR penalty using source or emitter followers because of gain from the preceding LNA 108. Accordingly, various embodiments of the compensating circuitry 206 include DC blocking capacitors 206A and 206B located between the LNA 108 and successor gain stages 110. In other embodiments, the compensating circuitry 206 includes a variable resistor or a fixed-value resistor driven by a variable source which is enabled to counteract the DC offset by providing an oppositely charged DC voltage at approximately the same amplitude across the resistor.

Figure 2B:
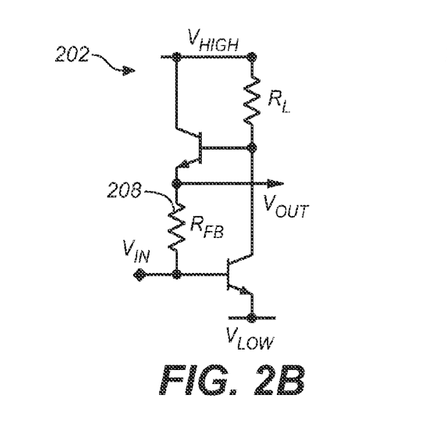
FIG. 2B illustrates circuitry of a shunt-feedback differential low noise amplifier, in accordance with an embodiment of the disclosure.
Figure 2C:
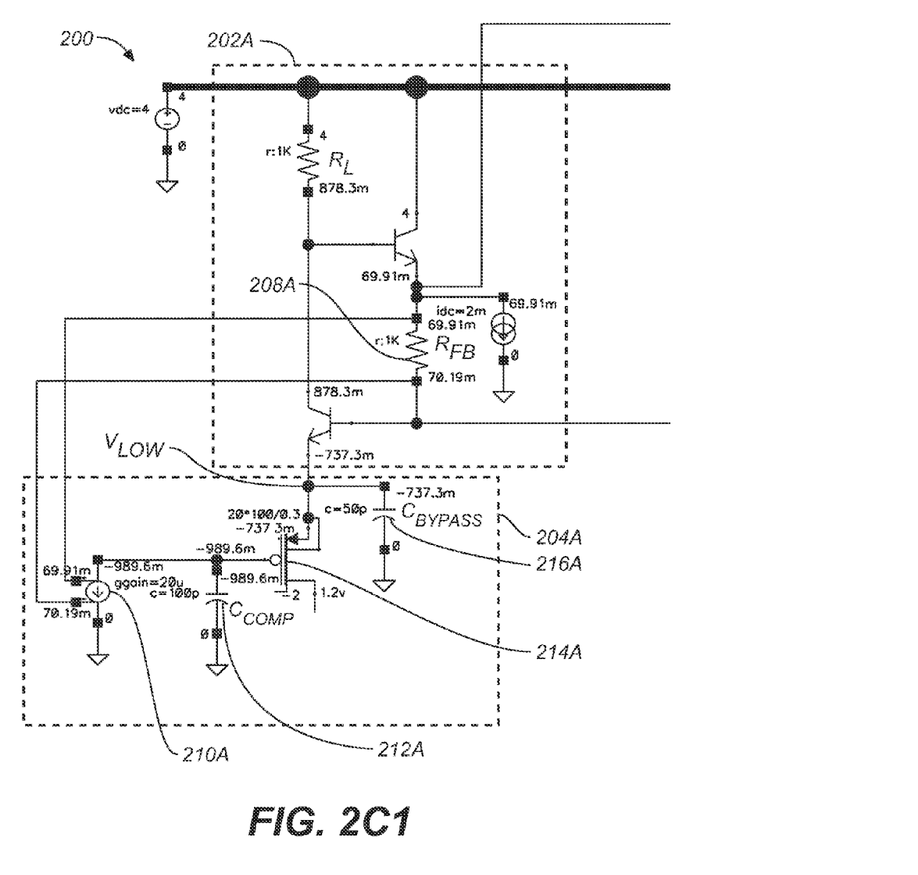

In some embodiments, each shunt-feedback amplifier 202 includes circuitry shown in FIG. 2B. The biasing circuitry 204 is enabled to detect the DC offset (i.e. the DC component) of an input signal from the MR head 102 via a respective feedback resistor 208 of each amplifier 202. According to various configurations or embodiments, the biasing circuitry 204 is enable to detect the DC offset by directly sensing the voltage drop across the feedback resistor 208 or by sensing a differential voltage associated with the feedback resistor.

Both approaches to detection are described below with reference to various circuit designs.

Figure 2C:
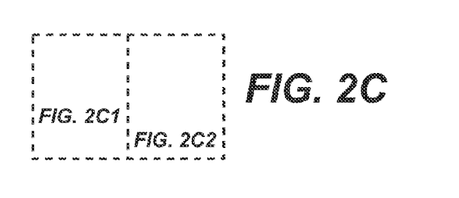
FIG. 2C illustrates circuitry of a signal path of a magnetic recording system including a shunt-feedback differential low noise amplifier, in accordance with an embodiment of the disclosure.
Figure 2C:
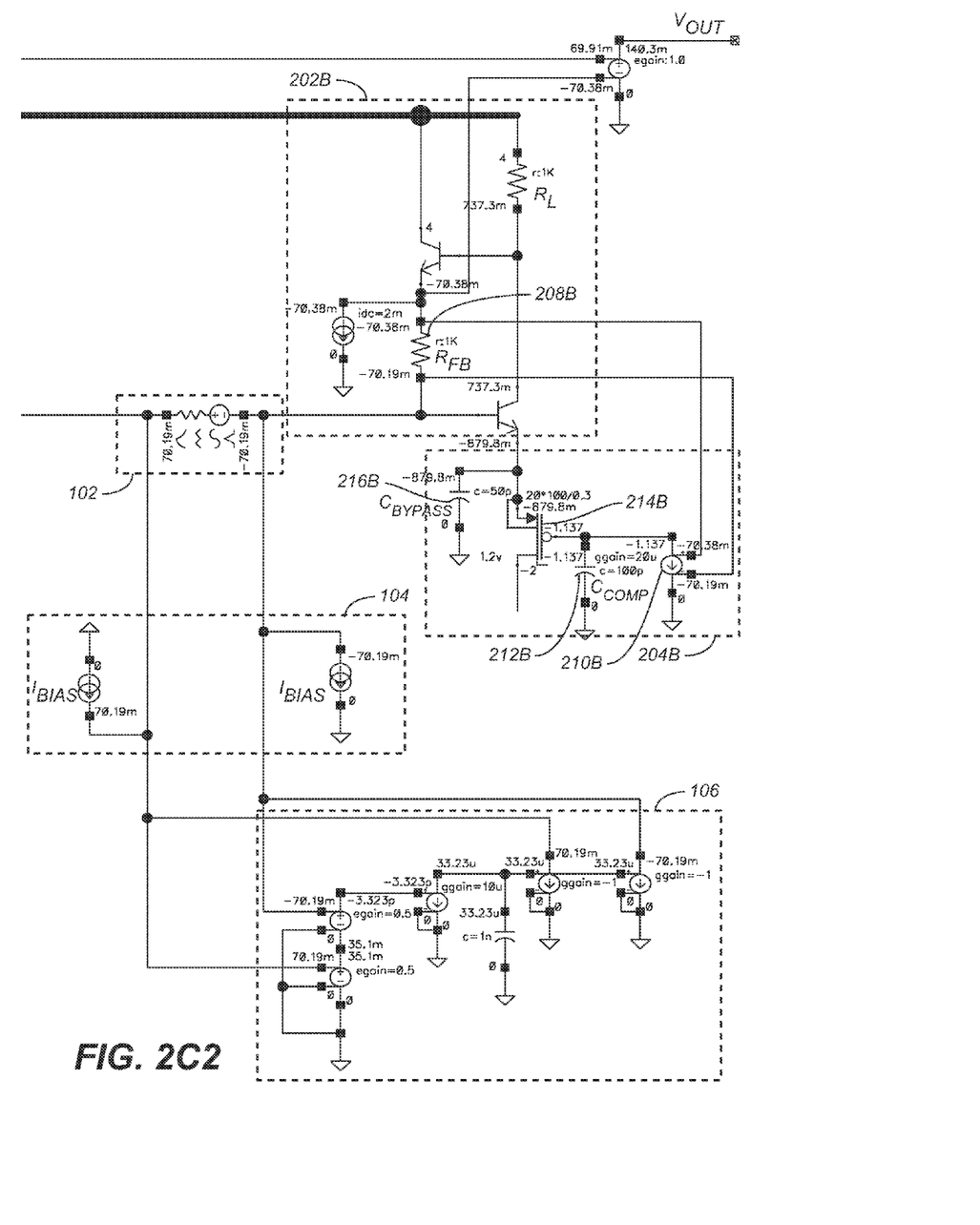

FIG. 2C is a diagram including circuitry for the pair of shunt-feedback amplifiers 202 according to an embodiment of signal path 200. The MR bias current injection sources 104 establish MR bias current $I_{BIAS}$ through the MR head 102. Concurrently, common-mode regulator loop shown behaviorally at 106 establishes on the MR head 102 a common mode voltage (CMV) substantially equal to zero, hence $\pm V_{MR}/2$ on the head terminals. The two shunt-feedback amplifiers 202A and 202B are conspicuously shown at top left and right portions of the circuit diagram in FIG. 2C.

In some embodiments, each amplifier 202 includes a tail current source to establish a respective emitter follower quiescent current. Biasing circuitry 204 including a source-follower 214 (e.g. PMOS transistors 214A and 214B) is positioned below each amplifier 202. The source electrode provides the $V_{LOW}$ reference voltage to the emitter of the common-emitter input transistor of the shunt-feedback pair 202. To assure that AC ground is maintained at $V_{LOW}$, despite rise with frequency in output impedance of the source-follower 214, a respective bypass capacitor 216 for each amplifier 202 is provided to ground. In some embodiments, the capacitor 216 because it is intrinsically biased, can be realized as a low-ESR MOS device. It is noted that capacitive parasitics to ground are inconsequential.

Figure 2D:
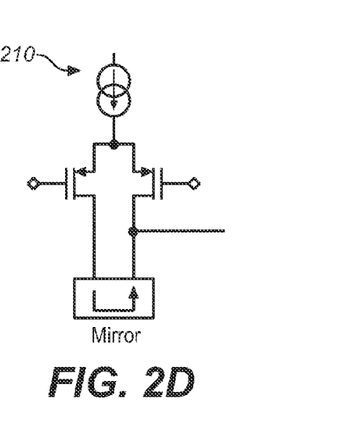
FIG. 2D illustrates circuitry of an operational transconductance amplifier (OTA), in accordance with an embodiment of the disclosure.

Biasing circuitry 204A and 204B operate to regulate the $V_{LOW}$ terminal (i.e. the PMOS source/input transistor emitter junction) of the respective amplifiers 202A and 202B to approximately $V_{LOW}=\pm V_{MR}-V_{BE}$, respectively, where $V_{BE}$ is the on-state base emitter voltage of the shunt-feedback stage's input transistor. For each amplifier 202, the voltage drop across the respective feedback resistor 208 is nulled using an operational transconductance amplifier (OTA) 210, modeled in FIG. 2C as a voltage-controlled current source 210 driving the PMOS gate 214 and a loop-compensation capacitor 212. An embodiment of the OTA circuitry is shown in FIG. 2D. At equilibrium, the collector current of the common-emitter stage is approximately $I_C=[V_{HIGH}-V_{BE}-V_{MR}/2]/R_L$. If $V_{HIGH} \gg (V_{BE}+V_{MR}/2)$, it is possible to stabilize the shunt-feedback loop-gain by making $V_{HIGH}$ proportional to absolute temperature (PTAT). In other embodiments, a fixed $V_{HIGH}$ value is employed with a temperature-dependent bleed current injected at the collector-end of $R_L$.

Figure 3A:
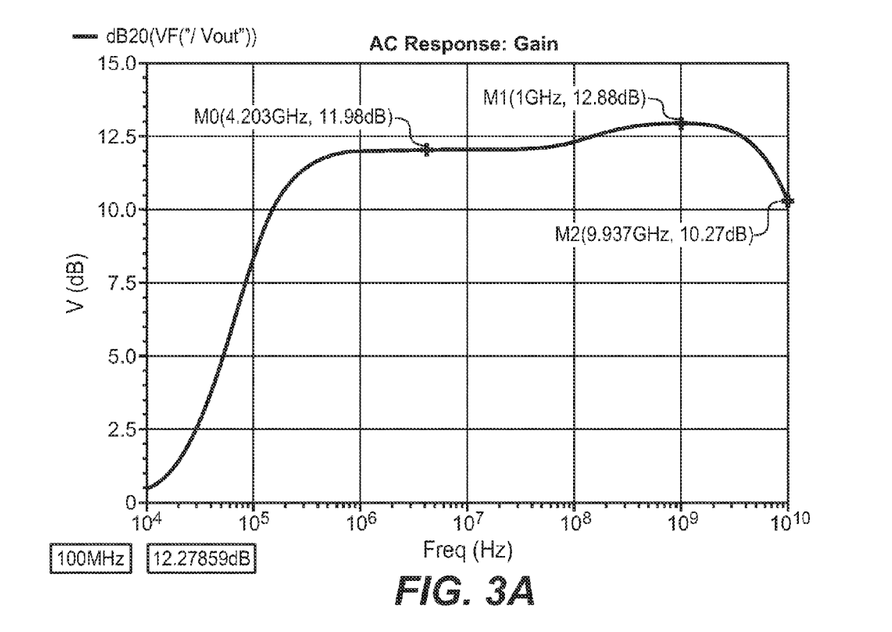
FIG. 3A is a frequency response graph of a shunt-feedback differential low noise amplifier, in accordance with an embodiment of the disclosure.
Figure 3B:
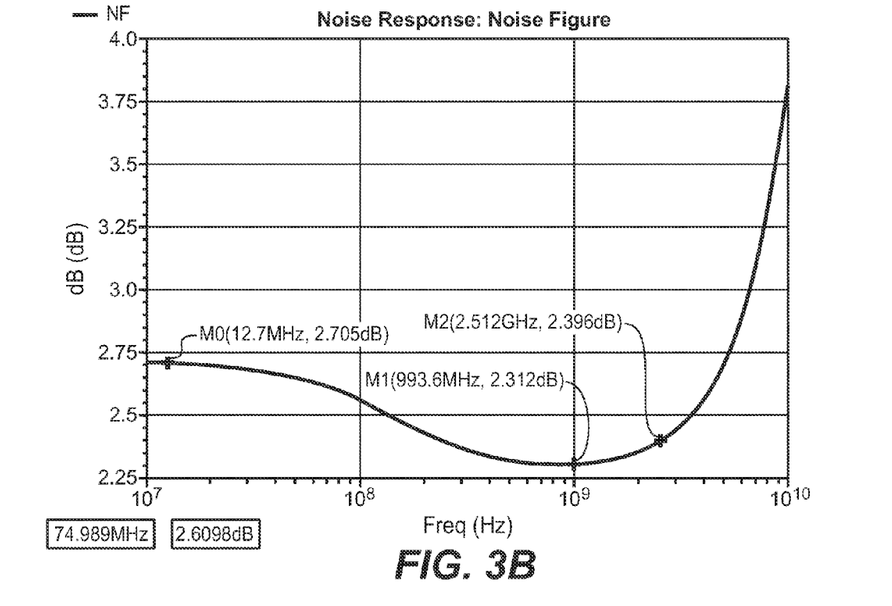
FIG. 3B is a noise response graph of a shunt-feedback differential low noise amplifier, in accordance with an embodiment of the disclosure.

FIGS. 3A and 3B are exemplary graphs of the frequency response and noise figure, respectively, associated with the embodiment shown in FIG. 2C, where $R_{MR}=400\Omega$ and $R_L=R_{FB}=1\,k\Omega$. A noise figure integrated between 10 MHz and 2.5 GHz of ~2.5 dB is attained, with ~3 mA standing current in the common-emitter stages and ~50 GHz Ft SiGe npn transistors. A zero-pole doublet at ~100 MHz is attributable to crossover between $C_{BYPASS}$ and PMOS output impedances. The lift caused by the doublet can be mitigated by a stiffer follower or buffer, possibly with local feedback, or by using a larger bypass capacitor. Alternatively, the doublet can be approximately canceled out by singularities in a later gain stage.

Figure 4A:
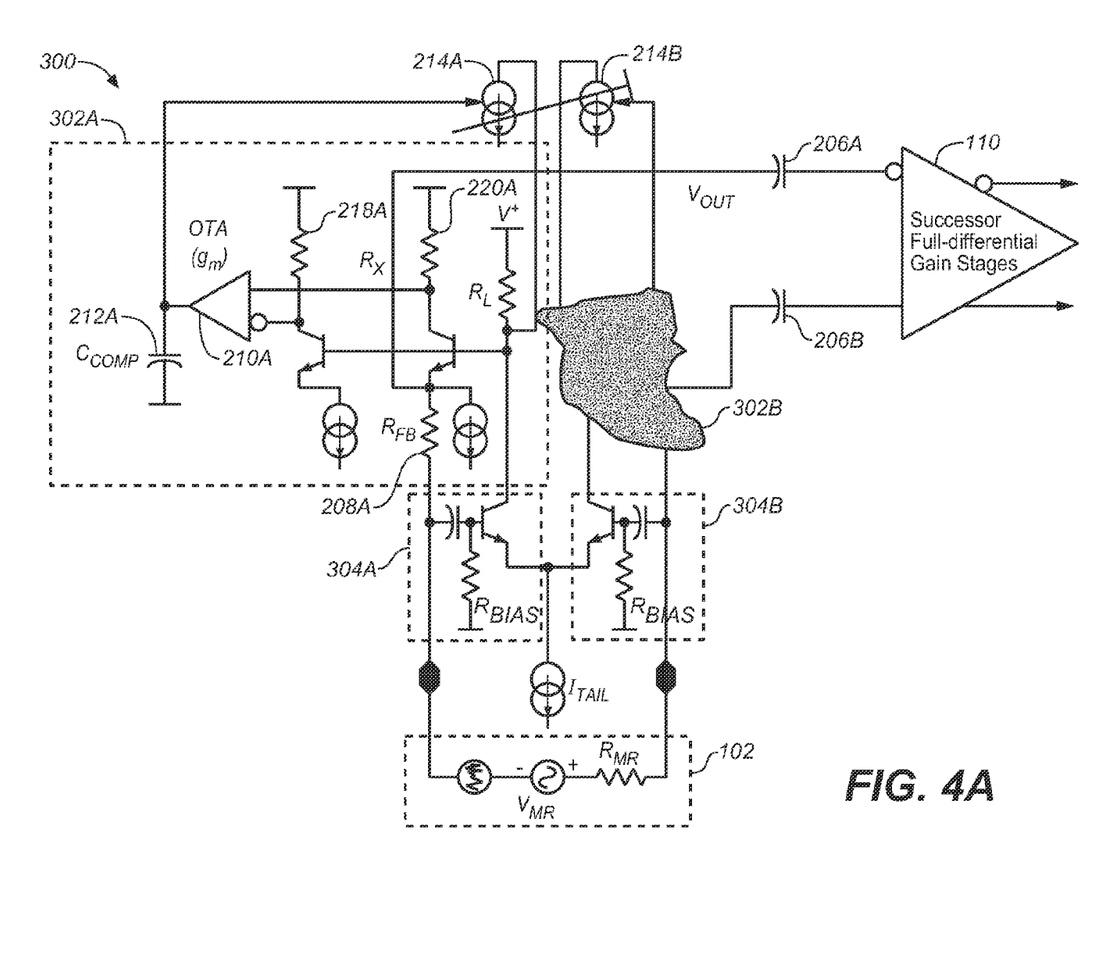
FIG. 4A is a block diagram illustrating a signal path of a magnetic recording system including a shunt-feedback differential low noise amplifier, in accordance with an embodiment of the disclosure.
Figure 4B:
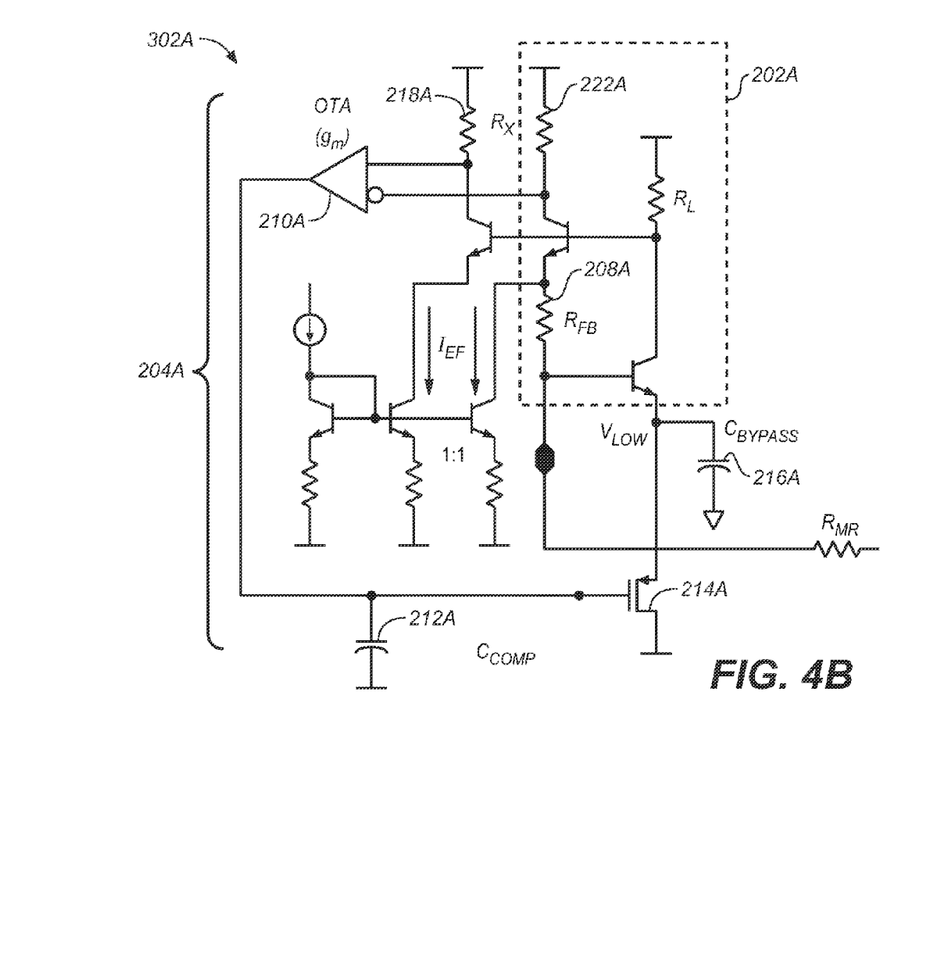
FIG. 4B is a block diagram illustrating biasing circuitry, in accordance with an embodiment of the disclosure.
Figure 4C:
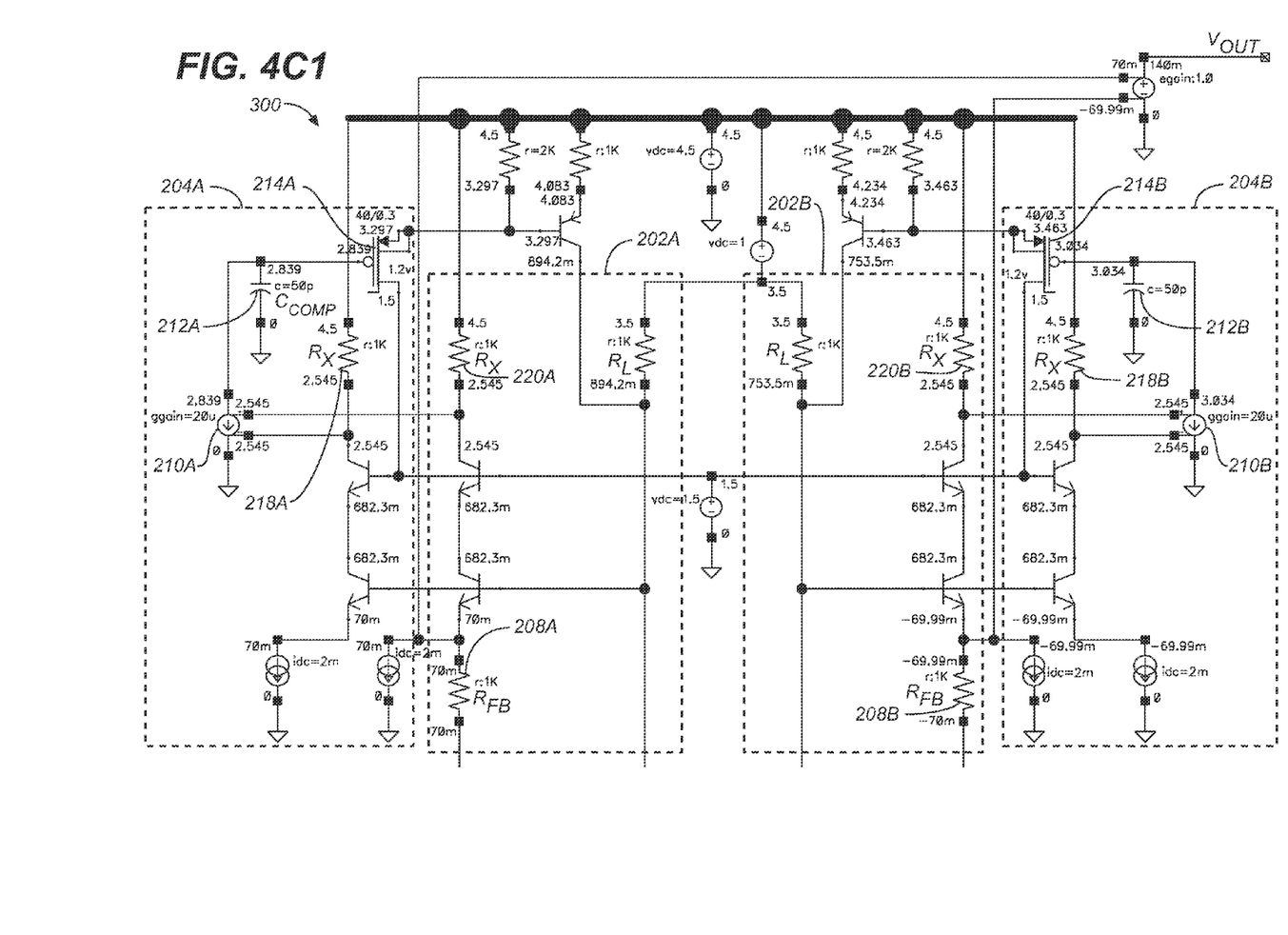
Figures 4C, 4C:
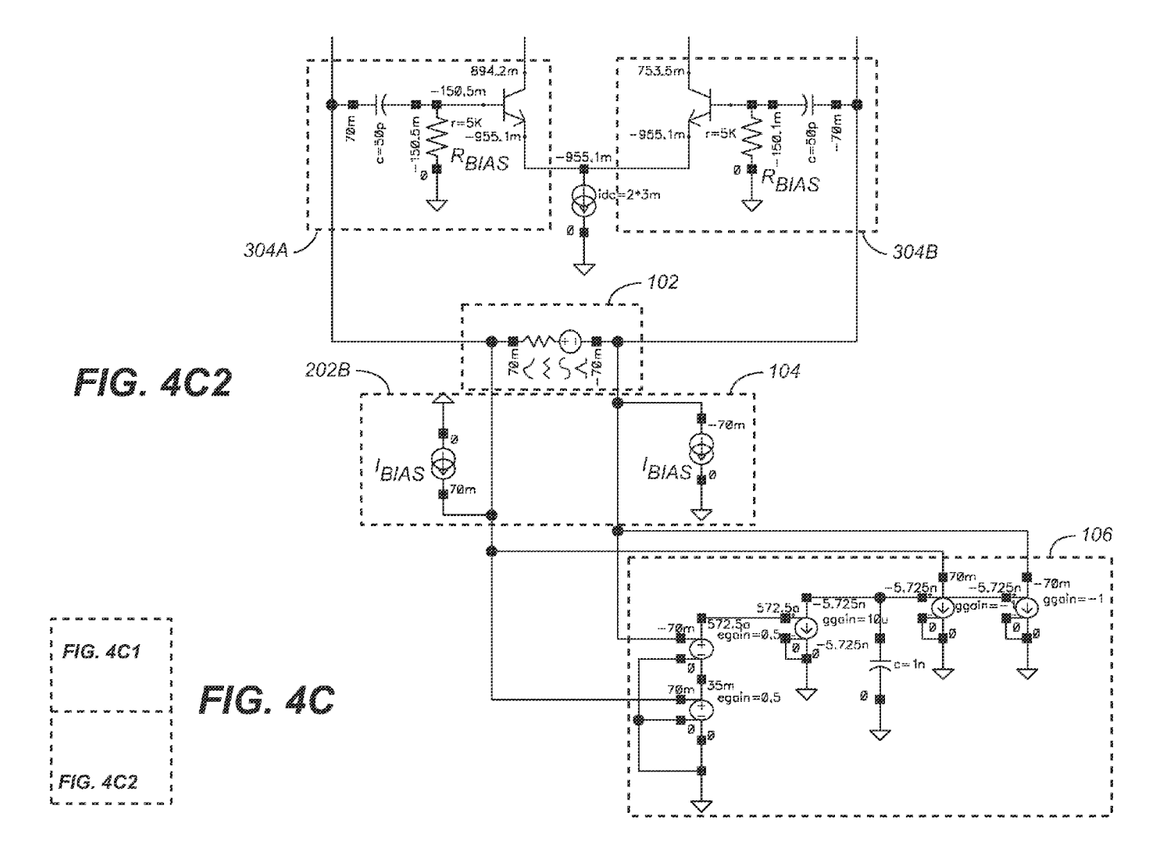

Another embodiment of a signal path 300 is illustrated in FIGS. 4A through 4C, where the biasing circuitry 204 is configured to sense the DC voltage offset $V_{MR}$ from the feedback resistor 208 indirectly. Embodiments of the biasing circuitry 204A for one of the shunt-feedback amplifiers 202A are illustrated in FIGS. 4A and 4B. However, it should be understood that portions of circuitry 302A and 302B substantially mirror one another. A fuller view is shown in the circuit diagram of FIG. 4C. Looking now to FIG. 4B, a second 'dummy' emitter follower is added. The second emitter follower and its tail current source are closely matched to the main emitter follower and its tail source. The voltage across the low-end of resistors 218A and 220A is differentially sensed by the OTA 210A, which closes a nulling loop through the PMOS follower 214A to set $V_{LOW}$ as described above. When the current through the feedback resistor 208A is zero, the voltages across the two resistors 218A and 220A are equal. In some embodiments, cascaded are further included to minimize deleterious effect of the resistors 218A and 220A on follower frequency response.

In the embodiment of the signal path 300 shown in FIGS. 4A and 4C, instead of servoing the shunt-feedback cell reference voltage, the collector voltages of the common-emitter amplifiers 202A and 202B are varied to enforce no DC current flow in the feedback resistors 208A and 208B. The signal path 300 includes DC blocks 304A and 304B ahead of the shunt-feedback pair 202 with an effective time constant $t_{DC\_BLOCK} \approx C_{BLOCK}*(r_b+r_\pi)$. For example, with $I_C=2$ mA standing current in each gain transistor, $\beta=50$, an LF pole required at ~500 kHz due to the AC coupling, and $r_b=15\Omega$, then $t_{DC\_BLOCK}=1/(2\pi 500e3)=C_{BLOCK}*(r_b+\beta/(qI_C/kT))$, $C_{BLOCK}\approx 475$ pF. This value is a significant improvement upon the prohibitive value $C_{BLOCK}\approx 13$ nF required if the capacitor is placed at the full input of the LNA 108 (i.e. $t_{DC\_BLOCK}=C_{BLOCK}*(Z_{in}/2)$, where $Z_{in}=50\Omega$. With reference to FIG. 4A, it is noted that the bias resistor from the capacitor/base junction of the each DC block 304 to ground has a value $R_{BIAS}$ much larger than the base input impedance of the transistor of each DC block 304 (i.e. $R_{BIAS} \gg Z_{BLOCK}$, where $Z_{BLOCK}$ is the input impedance of the transistor).

Figure 5A:
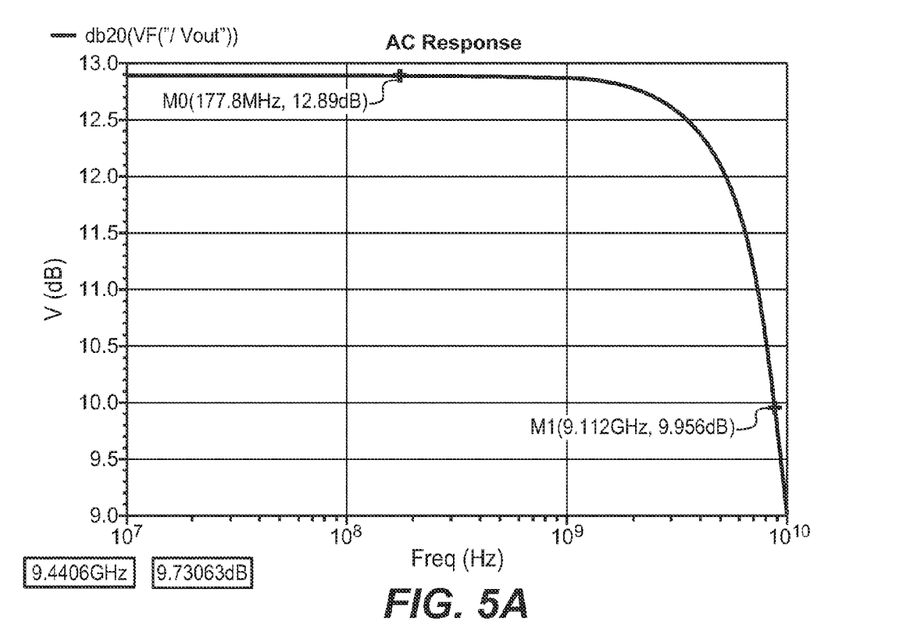
FIG. 5A is a frequency response graph of a shunt-feedback differential low noise amplifier, in accordance with an embodiment of the disclosure.
Figure 5B:
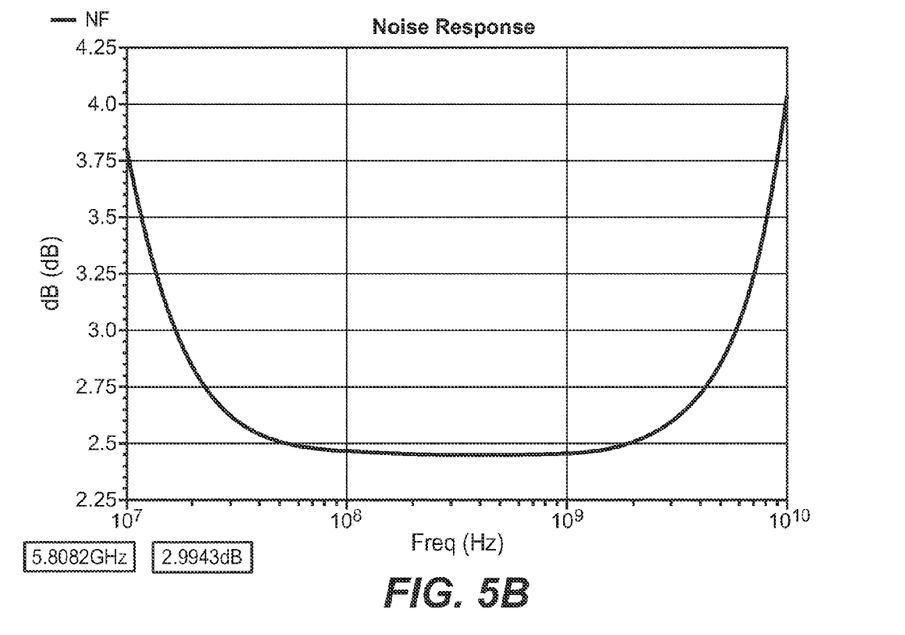
FIG. 5B is a noise response graph of a shunt-feedback differential low noise amplifier, in accordance with an embodiment of the disclosure.

As with signal path 200, the DC offset $V_{MR}$ is imaged to the output, where it can be removed by subsequent higher-level signal processing. FIG. 4C is a circuit diagram including at least a portion of signal path 300 according an embodiment of the disclosure, wherein the circuitry is implemented in a complementary SiGe BiCMOS process. The upper controlled bleed current sources are highly-degenerated compound NMOS-pnp tandems, to provide high impedance at the OTA/$C_{COMP}$ node. The frequency response and noise figure of this circuit is shown in FIGS. 5A and 5B, respectively. As with FIGS. 3A and 3B, the MR bias and common-mode control elements are idealized; in practice, they may be expected to erode the LNA integrated noise figure by ~0.5 dB.

Figure 6:
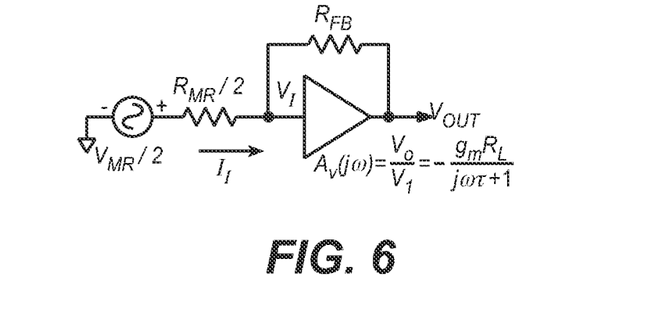
FIG. 6 is a block diagram illustrating an amplifier included in a pair of amplifiers making up a shunt-feedback differential low noise amplifier relative to a respective terminal of a magnetoresistive head, in accordance with an embodiment of the disclosure.

With reference to FIG. 6, brief discussion is further provided with regards to controlling the impedance seen looking from the MR Head into shunt pairs. Variation of $R_{FB}$ or loop-gain (i.e. $g_m R_L$ of the common-emitter (CE) transistor), or a combination of these measures, may be employed to instrument programmable input impedance generally required on Reader LNAs. The following equations are provided for reference.

$$A_v(\text{diff})=V_{out}/V_{in} \approx -A_v R_{FB}/2R_{FB}+R_{MR}(1+A_v)$$

$$\rightarrow -R_{FB}/R_{MR} \text{ as } A_v=g_m R_L \rightarrow \infty$$

$$\rightarrow A_v/2 \text{ (the } CE \text{ gain, } g_m R_L \text{) as } R_{FB} \rightarrow 0 < BUT > BW\downarrow,$$
$$\rightarrow CE \text{ pole}$$

$$Z_{IN}(\text{diff})=2*V_1/I_1=2R_{FB}/(1-A_v)$$

As can be seen by the equations above, the input impedance $Z_{IN}$ is a function of both $R_{FB}$ and loop gain.

Figure 7:
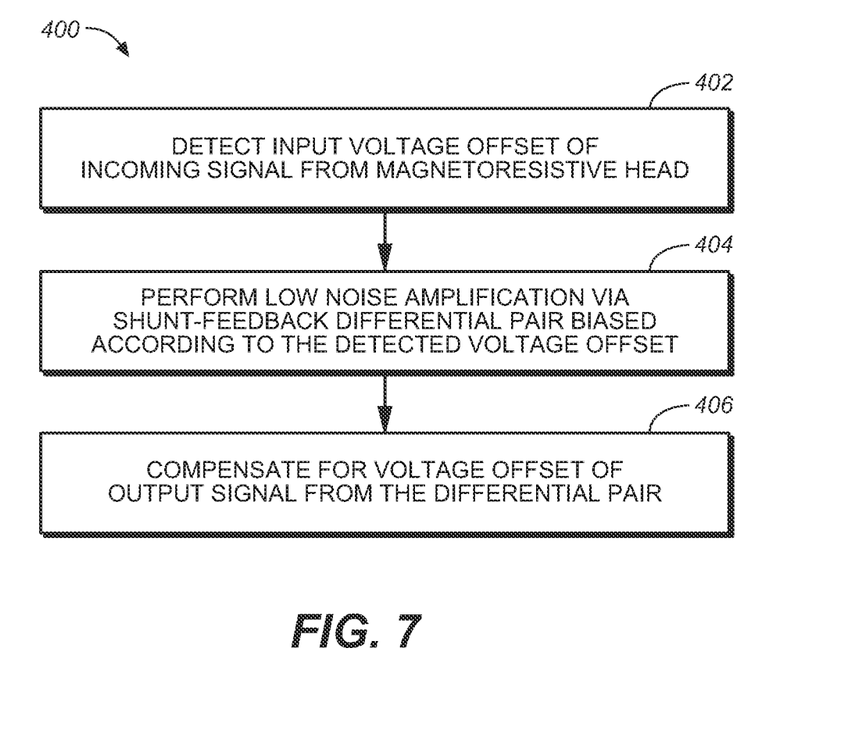
FIG. 7 is a flow diagram illustrating a method of performing low noise amplification for an incoming signal with an input voltage offset, in accordance with an embodiment of the disclosure.

FIG. 7 illustrates an embodiment of a method 400 of low noise amplification in accordance with the foregoing signal paths 100, 200, and 300. In some embodiments, method 400 is manifested by an embodiment or a portion of an embodiment of signal path 100, 200, or 300. As such, the method 400 includes any step or operation required to directly or indirectly carry out any function described with regard to an embodiment of signal paths 100, 200, 300, or an environment supporting one or more of the signal paths. Furthermore, the method 400 includes at least the following steps.

At step 402, the DC voltage offset resulting from the biased MR head 102 is detected via at least one feedback resistor 208. In some embodiments, the DC offset is detected by directly sensing the voltage drop across the feedback resistor 208, where the feedback resistor 208 is configured to receive an incoming signal from the MR head 102. In some embodiments, the DC offset is detected for each one of a pair of amplifiers 202A and 202B making up the LNA 108 via a respective feedback resistor 208A and 208B. In alternate embodiments, instead of sensing the DC offset via direct coupling to the feedback resistor 208, the DC offset is differentially sensed through low-end resistors 218 and 220 indirectly linked to the feedback resistor 208.

At step 404, the shunt-feedback amplifiers 202 are biased according to the detected DC offset. In some embodiments, biasing circuitry 204 includes an OTA 210 or another voltage controlled source driving additional circuitry, such as a compensation capacitor 212 and a source follower 214, to establish a reference voltage $V_{LOW}$ for each of the amplifiers 202. Each amplifier 202A and 202B is accordingly enabled to amplify a respective input signal from the corresponding terminal of the MR head 102 without needing to first compensate for the DC offset. Instead, the incoming signals appear to possess no offset from the perspective of the biased amplifiers 202. The DC component is then removed at step 406 by downstream compensating circuitry 206. In some embodiments, the compensating circuitry 206 is located at the LNA output prior to subsequent gain or signal processing stages. The foregoing embodiments enable low noise amplification in the presence of DC offsets with advantages including, but not limited to, improved SNR, less signal distortion and attenuation from parasitic capacitance, and simpler, more robust circuitry.

It should be recognized that the various functions or steps described throughout the present disclosure may be carried out by any combination of electronic circuitry known to the art, such as MOSFETs, BJTs, OTAs, resistive elements, conductive elements, semiconductive elements, variable current sources, variable voltage sources, and the like. Furthermore, signal processing circuitry or devices (e.g. processors or microcontrollers) may be configured to execute program instructions implementing methods, such as those manifested by embodiments described herein, which may be transmitted over or stored on a carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for low noise amplification in the presence of a voltage offset, comprising:
   a first amplifier configured to receive an input signal from a first terminal of a magnetoresistive head;
   a second amplifier configured to receive an input signal from a second terminal of the magnetoresistive head;
   biasing circuitry configured to bias the first amplifier and the second amplifier according to a detected input voltage offset;
   a first feedback resistor configured to receive an input signal from the first terminal of the magnetoresistive head, the biasing circuitry being configured to detect the input voltage offset for the first amplifier via the first feedback resistor; and
   a second feedback resistor configured to receive an input signal from the second terminal of the magnetoresistive head, the biasing circuitry being configured to detect the input voltage offset for the second amplifier via the second feedback resistor.

2. The system of claim 1, wherein the biasing circuitry includes:
   a first voltage-controlled source configured to bias the first amplifier according to the detected input voltage offset; and
   a second voltage-controlled source configured to bias the second amplifier according to the detected input voltage offset.

3. The system of claim 2, wherein each of the first voltage-controlled source and the second voltage-controlled source comprises a respective operational transconductance amplifier.

4. The system of claim 2, wherein the biasing circuitry further includes:
   a first transistor driven by the first voltage-controlled source, the first transistor being configured to generate a biasing voltage at a terminal of the first amplifier; and
   a second transistor driven by the second voltage-controlled source, the second transistor being configured to generate a biasing voltage at a terminal of the second amplifier.

5. The system of claim 4, wherein each of the first transistor and the second transistor comprises a respective PMOS transistor.

6. A signal path, comprising:
   a magnetoresistive head;
   a low noise amplifier coupled to the magnetoresistive head, the low noise amplifier comprising a first amplifier configured to receive an input signal from a first terminal of the magnetoresistive head, a second amplifier configured to receive an input signal from a second terminal of the magnetoresistive head, and
   biasing circuitry configured to bias the first amplifier and the second amplifier according to a detected input voltage offset;
   compensating circuitry configured to substantially remove a voltage offset from an output signal of the low noise amplifier;
   a first capacitor configured to substantially remove a first voltage offset from the output signal of the first amplifier; and
   a second capacitor configured to substantially remove a second voltage offset from the output signal of the second amplifier.

7. The signal path of claim 6, wherein the compensating circuitry includes:
   a first resistor coupled to a first variable source, the first variable source being configured to provide a voltage across the first resistor to substantially counteract the first voltage offset from the output signal of the first amplifier; and a second resistor coupled to a second variable source, the second variable source being configured to provide a voltage across the second resistor to substantially counteract the second voltage offset from the output signal of the second amplifier.

8. The signal path of claim 6, further comprising:

a first feedback resistor configured to receive an input signal from the first terminal of the magnetoresistive head, the biasing circuitry being configured to detect the input voltage offset for the first amplifier via the first feedback resistor; and a second feedback resistor configured to receive an input signal from the second terminal of the magnetoresistive head, the biasing circuitry being configured to detect the input voltage offset for the second amplifier via the second feedback resistor.

9. The signal path of claim 6, wherein the biasing circuitry includes:

a first voltage-controlled source configured to bias the first amplifier according to the detected input voltage offset; and a second voltage-controlled source configured to bias the second amplifier according to the detected input voltage offset.

10. The signal path of claim 9, wherein each of the first voltage-controlled source and the second voltage-controlled source comprises a respective operational transconductance amplifier.

11. The signal path of claim 9, wherein the biasing circuitry further includes:

a first transistor driven by the first voltage-controlled source, the first transistor being configured to generate a biasing voltage at a terminal of the first amplifier; and a second transistor driven by the second voltage-controlled source, the second transistor being configured to generate a biasing voltage at a terminal of the second amplifier.

12. The signal path of claim 9, wherein each of the first transistor and the second transistor comprises a respective PMOS transistor.

13. A method of low noise amplification in the presence of a voltage offset, comprising:

detecting an input voltage offset of at least one signal from a magnetoresistive head;

receiving an input signal from a first terminal of a magnetoresistive head via a first amplifier biased according to the detected input voltage offset;

receiving an input signal from a second terminal of the magnetoresistive head via a second amplifier biased according to the detected input voltage; and compensating for an output voltage offset of at least one signal from at least one of the first amplifier and the second amplifier, wherein compensating for the output voltage offset of at least one signal from at least one of the first amplifier and the second amplifier comprises:

providing a voltage across a first resistor to substantially counteract a first voltage offset from the output signal of the first amplifier; and providing a voltage across a second resistor to substantially counteract a second voltage offset from the output signal of the second amplifier.

14. The method of claim 13, wherein detecting the input voltage offset of at least one signal from a magnetoresistive head comprises:

receiving an input signal from the first terminal of the magnetoresistive head via a first feedback resistor;

detecting a voltage across the first feedback resistor via a first voltage-controlled source;

receiving an input signal from the second terminal of the magnetoresistive head via a second feedback resistor; and detecting a voltage across the second feedback resistor via a second voltage-controlled source.

15. The method of claim 14, further comprising:

biasing the first amplifier according to the detected input voltage offset via the first voltage-controlled source; and biasing the second amplifier according to the detected input voltage offset via the second voltage-controlled source.

16. The method of claim 15, wherein biasing the first amplifier according to the detected input voltage offset via the first voltage-controlled source comprises:

generating a biasing voltage at a terminal of the first amplifier via a first transistor driven by the first voltage-controlled source; and generating a biasing voltage at a terminal of the second amplifier via a second transistor driven by the second voltage-controlled source.

17. The method of claim 13, wherein compensating for the output voltage offset of at least one signal from at least one of the first amplifier and the second amplifier comprises:

substantially removing the first voltage offset from the output signal of the first amplifier utilizing a first capacitor; and substantially removing the second voltage offset from the output signal of the second amplifier utilizing a second capacitor.

* * * * *